Feb. 4, 1964    W. H. BENNETT    3,120,475
DEVICE FOR THERMONUCLEAR GENERATION OF POWER
Filed Oct. 10, 1957    3 Sheets-Sheet 1
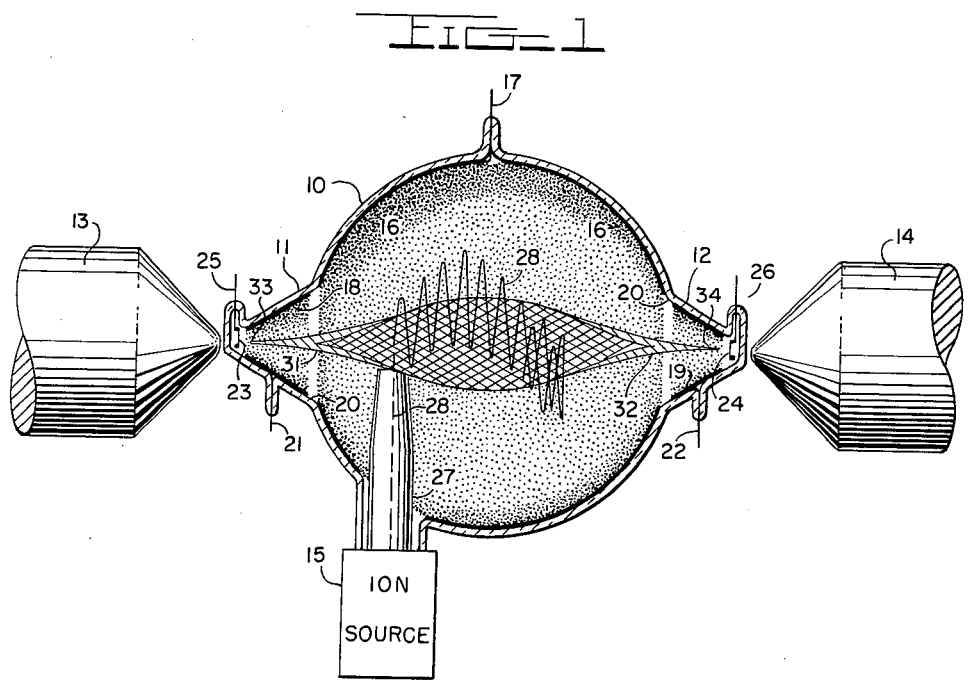
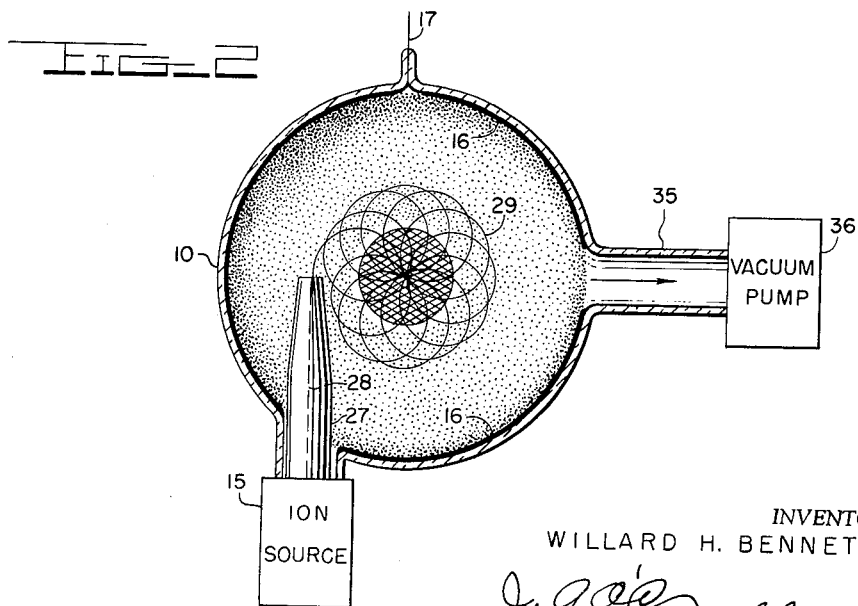
INVENTOR
WILLARD H. BENNETT
ATTORNEYS

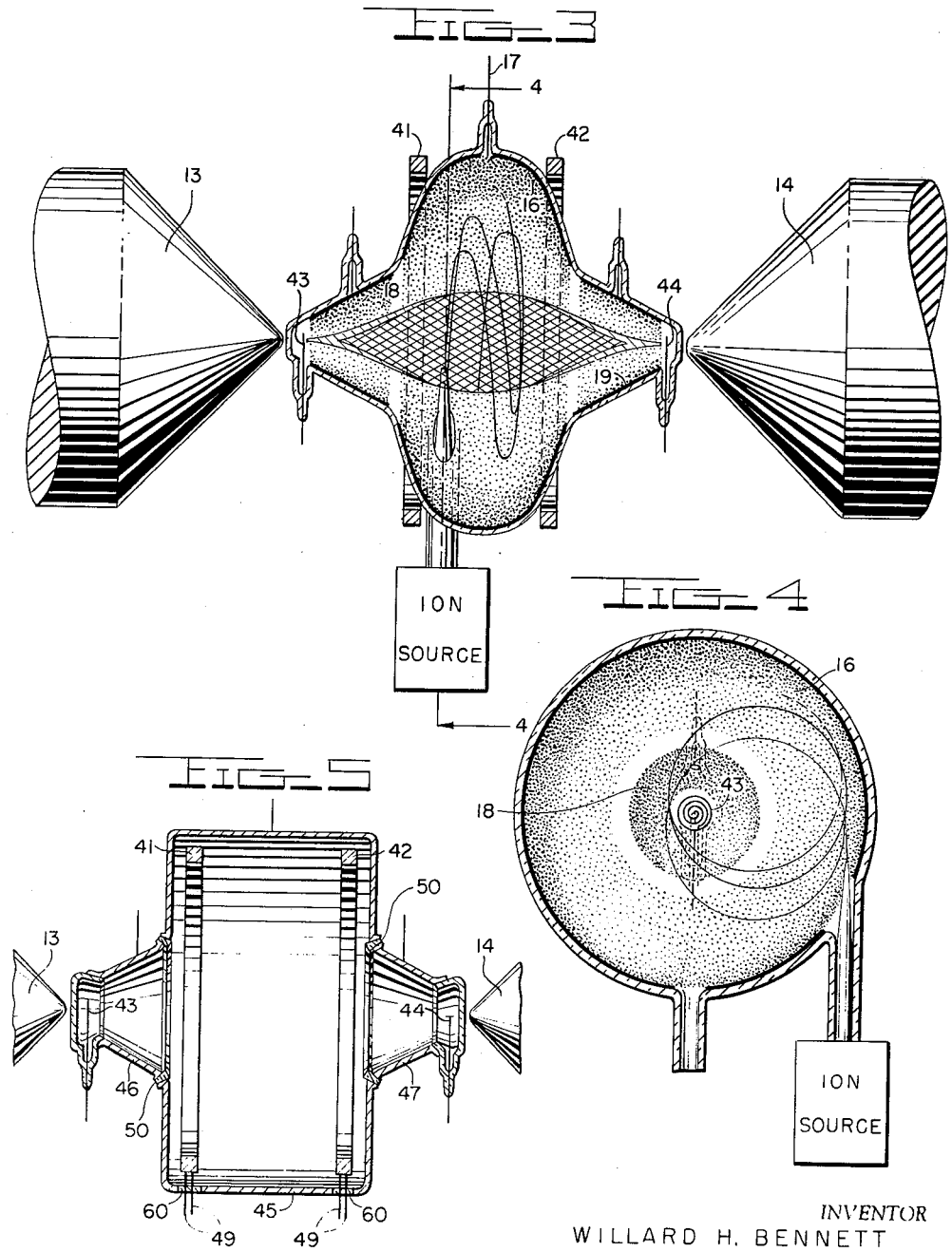

Feb. 4, 1964 W. H. BENNETT 3,120,475
DEVICE FOR THERMONUCLEAR GENERATION OF POWER
Filed Oct. 10, 1957 3 Sheets-Sheet 3
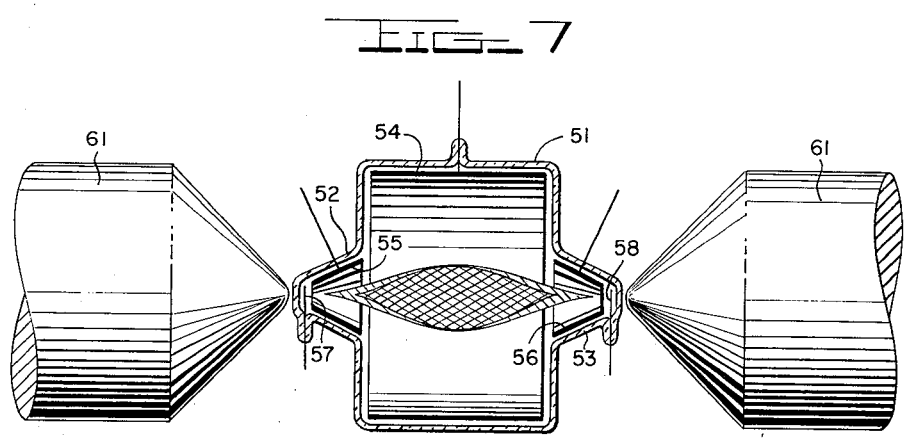
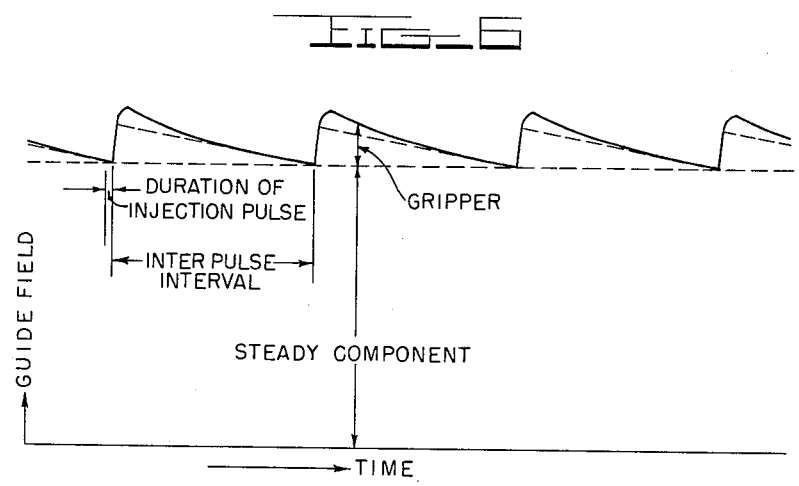
INVENTOR
WILLARD H. BENNETT United States Patent Office 3,120,475
Patented Feb. 4, 1964

3,120,475
DEVICE FOR THERMONUCLEAR GENERATION OF POWER
Willard H. Bennett, 174 Chesapeake St. SW., Washington, D.C.
Filed Oct. 10, 1957, Ser. No. 689,455
6 Claims. (Cl. 176—5)
(Granted under Title 35, U.S. Code (1952), sec. 266)

The invention described herein may be manufactured and used by or for the Government of the United States of America for governmental purposes without the payment of any royalties thereon or therefor.

The present invention relates to generation of power and more particular to a method and apparatus for thermonuclear generation of power.

Heretofore investigations into thermonuclear reactions have tended to produce a reaction for very short periods of time and an acceptable instrument has not been provided for sustained reactions. A controlled fusion reactor is known as a device within which appropriate isotopes of light elements could be caused to undergo nuclear fusion, the end result being the controlled production and extraction of useful quantities of energy, in excess of that required to operate the device. The problem of achieving a controlled thermonuclear reaction is to heat a suitable nuclear fuel to high kinetic temperature and then to controliably confine the reaction at these temperatures for a sufficiently long time to permit the fuel nuclei to undergo fusion with the consequent release of energy in the excess of the losses from producing the reaction. The excess energy flux would then be available to be harnessed as power.

One of the most important problems in the thermonuclear ignition is not the amount of heat energy required, but the manner in which this energy can be efficiently supplied to a plasma. A plasma is a completely ionized gas which is regarded as a mixture of two gases, an electron gas and a positive ion gas, the latter consisting usually of atomic nuclei stripped of their electrons. The methods attempted for sustained reactions have not been successful because the ions and electrons forming the gas have heretofore escaped from the ends of the apparatus.

The present invention overcomes the shortcomings of the methods heretofore used by providing electrodes at the ends of the chamber within which the reaction takes place. Potentials applied to the electrodes act upon particles within the chamber to confine the particles to a definite orbital path between extremities near the ends of the chamber. This confinement permits collisions between the ions which react to produce thermonuclear power within the chamber while confining the ions within the chamber. The energy may be taken off as heat in the usual manner by fluids which surround the chamber or, it may be taken off by any other means well known in the art.

It is accordingly an object of the present invention to provide a device capable of producing sustained thermonuclear generation of power.

Another object is to provide a method for producing sustained thermonuclear generation of power.

Yet another object is to provide a method and device for confining ions in a chamber for producing sustained thermonuclear generation of power.

Other and more specific objects of this invention will become apparent upon a careful consideration of the following detailed description when taken together with the accompanying drawings, in which:

FIG. 1 is a sectional front view of one form of a device for thermonuclear generation of power which illustrates the relative positions of the parts, FIG. 2 is a sectional end view which more clearly illustrates the relationship between an ion source and the orbital paths in the chamber;

FIG. 3 is a modification of the device shown in FIG. 1 which includes radio-frequency coils on the outside of the chamber;

FIG. 4 is a sectional view along lines 4—4 which illustrates the relationship between the ion source and the orbital path of the ions in the chamber;

FIG. 5 is a modification of FIG. 3 which illustrates the R-F coils within a chamber made of metallic sections insulated from each other;

FIG. 6 represents the steady guide-field with the additional saw-tooth pulses added thereto; and FIG. 7 is still another modification of the device shown in FIG. 1.

The device of the present invention in general terms comprises a chamber of suitable material, an axially disposed centrally located electrode which may be positioned within the chamber about the inner surface or made to form the central surface portion of the chamber, and a pair of electrodes at each end of the chamber. The chamber is positioned between the pole pieces of a magnet such that the magnetic lines of force are symmetric with the longitudinal axis of the chamber. Due to the potentials on the electrodes and the lines of force of the magnetic field, ions projected into or sealed within the chamber are curved into orbits about the magnetic lines of force, advance around the axis of the field and also move back and forth past the mid-plane of the field and are mixed with electrons near the longitudinal axis of the chamber. Thermonuclear power is generated from ion collisions and the reaction is sustained and made possible by the electrodes at the ends of the chamber which prevent the ions and electrodes from escaping from the chamber and forces them back into the chamber where collisions take place between the ions.

Now referring to the drawings of the present invention wherein like reference characters represent like parts throughout, there is shown by illustration in FIGS. 1 and 2, a device for thermonuclear generation of power. The device comprises a somewhat highly evacuated spherical or oblate chamber 10 made of any suitable insulating material that will withstand high temperatures and which has approximately conical shaped end pieces 11 and 12 extending therefrom along the longitudinal axis thereof. The interior of the chamber is made conductive over most of the entire area except for the ends directly adjacent to the ends of magnetic pole pieces 13 and 14 and except for the places in the chamber where the ion source 15 and a vacuum pump 36 connects with the chamber. A conductive portion of electrode 16 over the inner surface of the spherical section is connected through the chamber wall to an electrical lead 17 and electrically separated at 20 from the conductive portions or electrodes 18 and 19 along the inner surface of the conical shaped end pieces. The electrodes 18 and 19 of the end pieces are connected respectively to electrical leads 21 and 22 which are brought out through the wall surface. The end pieces directly opposite the magnetic pole pieces 13 and 14 have positioned therein electrodes 23 and 24 which are electrically insulated from electrodes 18 and 19 and connected respectively to the electrical lead lines 25 and 26. The ion source is connected to the chamber by any suitable means and is provided with a magnetic shielding tube 27 which shields the ions from the magnetic lines of force upon entering the chamber.

In operation of the device the chamber is highly evacuated and positioned in the magnetic field such that the lines of force are symmetric with the longitudinal axis. Suitable potentials are applied to electrodes 16, 18, 19, 23 and 24 such that electrodes 18 and 19 each have sufficient positive potential with respect to electrode 16 to repel the positively charged ions that approach the ends of the chamber and electrodes 23 and 24 have sufficient negative potential with respect to electrode 16 to repel the electrons in the chamber.

The ion source 15 projects a beam of ions 28 of deuterium and/or tritium into the chamber at a place in the magnetic field between pole pieces 13 and 14 which is both off the longitudinal axis of the magnetic field and off the mid-plane of symmetry of the field as shown in FIG. 2. These ions are curved into an orbit 29 about the magnetic lines of force and while describing loops around the magnetic lines of force, advance around the longitudinal axis of the field and also move back and forth past the mid-plane of the field. The orbit intercepts itself much more frequently near the axis than remote from it, and consequently, the collisions reduce the momentum of the ions in directions perpendicular to the lines of force more rapidly near the axis than away from it. This has the effect of gradually reducing the radius of gyration of the ions about the lines of force and to displace the center of gyration towards the axis as illustrated by the cross-hatched zone in FIGS. 1, 2, 3 and 7 of which the ions are represented by the reference character 29. Sufficient ion density in the tube will shift the center of gyration enough to prevent the ion beam from striking the magnetic shielding tube 27 through which the ions entered the chamber.

The continuing effect of elastic collisions of the ions converts part of the momentum of the ions into momentum parallel with the magnetic lines of force to cause the ions to execute excursions of increasing amplitude back and forth along the axis of the chamber towards the magnetic poles against the magnetic mirror effect near the poles. The electrodes 18 and 19 are held at a potential which is sufficiently positive relative to electrode 16 to make the points 31 and 32 on the axis much more positive than the potential difference through which the ion moved during initial entrance into the tube. This potential difference between electrode 16 and electrodes 18 and 19 at the ends of the chamber is for the purpose of repelling the positively charged ions spiraling around the axis and moving toward each of the conical ends of the chamber and forcing them back toward the center of the chamber where the ions are subject to more collisions in the chamber as illustrated by the cross-hatched area along the axis.

The electrons which are mixed with the ions near the middle of the tube are rotating in the opposite direction about the axis and the magnetic lines of force from that of the ions and are also executing excursions toward the conical ends. These electrons will be sped up by the attraction of electrodes 18 and 19 which repelled the ions and therefore, require additional electrodes to stop the electrons. Electrodes 23 and 24 are provided at the end of the chamber at the conical end sections and are maintained at a potential which is sufficiently negative relative to electrode 16 to force the electrons at points 33 and 34 back toward the center of the chamber.

Both the ions and electrons are rotating about the magnetic lines of force along the axis, back and forth across the midpoint of the chamber to form a plasma within the chamber. The velocity at which the particles travel will determine their amplitude and only those with the higher velocities will reach the end points at 31 and 32 for the ions and 33 and 34 for the electrons before they are repelled respectively by the electrodes 18 and 19, and 23 and 24. Those with lesser velocities will be repelled before they reach the end point. The important feature is to keep the ions and electrons within the chamber wherein the transfer of heat energy from the nuclei to the plasma is effected through collisions between the nuclei and the electrons.

The radiation from the collisions between charged particles inside the chamber, in part, causes photo-emission from electrodes 23 and 24 and the photo-electrons so liberated from the electrodes move into the central portions of the chamber, are scattered by collisions, and tend to neutralize the space charge of the ions being projected into the chamber from the ion source. Electrodes 23 and 24 may either or both be hot electrodes from which electrons flow to tend to neutralize the space charge of the ions near the axis. In this way, a steady stream of ions such as deuterium and/or tritium ions, of predetermined energy is projected into a static magnetic field and a static electric field which fields confine the ions and their associated space charge neutralizing electrons in an otherwise high vacuum region, while thermonuclear power is generated from the ion collisions in this steadily confined plasma.

An arm 35 extending from the chamber is connected to a suitable vacuum pump 36 which is used to evacuate the chamber and to pump off any neutral gas which enters the chamber from the walls or by recombination of ions and electrons in the chamber.

The thermonuclear generation of power is provided through the use of the electrodes at the ends of the chamber which prevents the escape of ions and electrons and keeps them rotating within the chamber. A constant source of ions along with collisions which take place during random rotation about the lines of magnetic force provides a fusion reactor for thermonuclear generation of power due to collisions of the ions.

The modification shown in FIG. 3 illustrates a device such as shown in FIG. 1 which has been modified to include coils of wire 41 and 42 about the chamber positioned on opposite sides of the electrical lead 17 and which includes the ion source between the coils. The ion source may or may not be off-set with respect to the center of the chamber for satisfactory operation. In this modification the chamber is made of insulating material with electrical coatings 16, 18 and 19, on the inside as disclosed for the modification of FIG. 1. No additional change over the device of FIG. 1 resides in the structure and operation of the electrodes at the end of chamber. In the modification illustrated by FIG. 3 the elements 43 and 44 may be cold cathodes or may be filaments made in the form of a spiral to provide partial heat shielding for the filament which carries an alternating current superimposed on the negative direct current normally applied thereto. The purpose of the alternating current is to set up a flow of electrons between the filaments to ionize the gas within the chamber prior to the injection of the charged particles. Ionization is carried out until an arc is produced then the charged particles are injected into the chamber and the alternating current may be turned off when the ionization becomes self-sustaining.

In operation of the device shown by illustration in FIG. 3 the electrodes are connected to the proper circuitry as described for the device of FIG. 1, the chamber is evacuated and then a deuterium and/or tritium gas is admitted into the chamber, an alternating current may be superimposed on the negative line to electrodes 43 and 44, to cause an arc between the electrodes. The arc ionizes the gas in the chamber to aid in concentrating the injected ions towards the axis. The ions are injected into the chamber in pulses of short duration by any suitable means and for each injection an approximately saw-tooth shaped increase in guide field is applied for each injection pulse by means of coils 41 and 42. This will be referred to as the gripper field. Beginning near the end of the ion injection pulse, the current in coils 41 and 42 is steeply increased momentarily which builds up the guide field-strength and then the gripper field is slowly reduced by returning the current in coils 41 and 42 to zero at the beginning of the next ion injection pulse. The steep rise in the guide field shown by illustration in FIG. 6, reduces the radii of the orbits of the ions that were just injected into the chamber, thus holding the ions away from the injector. The collisions of the ions with electrons and other ions reduces the momenta of ions in directions perpendicular to the axis and so reduces the radii of curvature of the orbits of the ions. The decrease in current in coils 41 and 42 is made slow enough for the corresponding increase in radius of curvature of the ion orbits to be less rapid than the decrease in the same radii of curvature due to collisions. Consequently the ions are held away from the injector and are moved toward the axis of the guide field. The reduced radius of the orbit causes more collisions between the ions and electrons in the chamber and consequently improves the reaction to provide thermonuclear generation of power. The injection of ions and application of the varying current through coils 41 and 42 is repeated over and over for continual operation and then the ions follow paths as described for the device of FIG. 1.

The modification shown by FIG. 5 operates as the modification of FIG. 3 however there is a difference in the structure of the chamber and the relationship between the chamber and the coils 41 and 42. In FIG. 5 the chamber is made with a cylindrical central portion with walls of conductive material rather than with insulating material with electrodes along the inner surface as in the devices of FIGS. 1 and 3. As shown, the device includes a centrally disposed electrode wall surface 45 which is insulated at 50 by any suitable means such as glass or porcelain from the somewhat conical shaped end electrodes 46 and 47 also formed by the wall of the chamber. The spiral filaments 43 and 44 positioned at the ends adjacent to the magnetic pole pieces enter through insulating material at the very ends of the chamber which is secured to the conductive wall surface by any suitable means. In this modification the coils of wire 41 and 42 are positioned on the inner surface of the chamber in order for the current passing through the coils to have any effect on the magnetic guide field and have conductive wires 49 connected thereto for connection with any suitable electrical source. The wires are insulated from the chamber by insulating means 60. The conductive material of the chamber would block the lines of force produced by the varying current therefore the coils must be placed on the inside of the chamber. The operation of the device of FIG. 5 is the same as that described for the modification of FIG. 3.

Still another modification is shown by illustration in FIG. 7 wherein the central portion of the chamber is formed as a cylinder 51 having a closed end with approximately conical sections 52 and 53 extending therefrom. The chamber as shown is made of insulating material such as glass or any other suitable material and has a separate electrode 54 along the inner cylindrical surfaces of the chamber, with electrodes 57 and 58 positioned at each end of the chamber, suitable lead lines are connected to the electrodes and brought out through the chamber wall to appropriate circuitry. The chamber is not limited to insulating materials but may be made of metal wherein the electrodes will form the walls of the chamber and insulated from each other as described above for the modification shown in FIG. 5. The chamber is positioned between magnetic poles 61 such that the magnetic lines of force are symmetric with the longitudinal axis of the chamber through the cylindrical section and the end sections. In this modification, fusionable light isotopes such as deuterium and/or tritium gas are admitted into an otherwise evacuated chamber and thermonuclear generation of power takes place by ionization of the gas within the chamber.

In operation of the device illustrated by FIG. 7, the electrodes 57 and 58 may be cold cathodes, or one or both may be made in the form of spiral filaments as disclosed for the modifications of FIGS. 3 and 5 wherein the filaments may be maintained at various potentials relative to each other for satisfactory operation of the device. For example, one filament may be hot and the other cold; one may be hot and the other hot; or both of the filaments may be cold. In either of the above situations, the electrons are able to move readily approximately in directions of magnetic lines of force to establish a region in the middle of the chamber at approximately the potential of the cathodes. Electrons from the filaments collide with the gas atoms in the chamber to cause ionization of the gas resulting in positive ions and free electrons. The ions by attraction of the electrodes and guided by magnetic lines of force travel in orbits about the axis and back and forth between the ends of the chamber as illustrated by the cross-hatched area where electrodes 55 and 56 are held at a high positive D.C. potential to repel the ions near the ends of the conical sections and the end filaments 57 and 58 are held at a high negative D.C. potential to repel the electrons to cause the back and forth motion and to provide the necessary collisions to maintain ionization of the gases. The collisions between the particles causes the thermonuclear generation of energy which is taken off as heat by surrounding liquids in the usual manner.

It is obvious that the various modifications can be made with chambers made of insulating material and having the electrodes either coated on the inner surface or positioned therein as separate electrodes Also, the chambers can be made of conductive material which forms the electrodes which are insulated from each other to form the separate electrodes.

Obviously many modifications and variations of the present invention are possible in the light of the above teaching. It is therefore to be understood, that within the scope of the appended claims, the invention may be practiced otherwise than as specifically described.

What is claimed is:

1. A method of producing thermonuclear generation of power which comprises applying a magnetic field in a chamber symmetric about an axis of said chamber, applying an electrical field about said magnetic field symmetric with said axis, applying a positive potential to a first electrode and a negative potential to a second electrode both of which are positioned along the axis of said chamber with one each of said first and second electrodes positioned at opposite ends of said chamber and, injecting ions into said magnetic field at a position which is off the center of said magnetic field and off the axis of said chamber whereby said injected ions are curved into an orbit about the magnetic lines of force of the applied magnetic field, while advancing around the longitudinal axis of the magnetic lines of force and moving back and forth past the mid-plane of the applied field causing ion collisions near the axis of the chamber.

2. The method as claimed in claim 1 which comprises superimposing a varying current about said magnetic field.

3. A method of producing thermonuclear generation of power which comprises applying a magnetic field in a chamber symmetric about an axis of said chamber, applying an electrical field about said magnetic field symmetric with said axis, producing an alternating current discharge along the axis of said chamber between electrodes at opposite ends thereof to ionize gases in said chamber, injecting ions into said chamber, superimposing a varying current about said magnetic field and applying a positive and a negative potential to separate electrodes positioned at each of the opposite ends of said chamber to prevent charged particles from escaping from said chamber whereby said injected ions are curved into an orbit about the magnetic lines of force of the applied magnetic field, while advancing around the longitudinal axis of the magnetic lines of force and moving back and forth past the mid-plane of the applied field causing ion collisions near the axis of the chamber.

4. A thermonuclear device which comprises:
 (a) an evacuatable chamber having a central portion with opposing convergent end sections extending about an axis through said chamber with their apex ends facing in a direction away from the center of said chamber, (b) an electrically conductive electrode within said chamber extending along the inner surface of said central portion of said chamber symmetrical with said axis through said chamber, (c) an electrically conductive electrode on the inner surface of each of said convergent end sections of said chamber and electrically separated from said electrically conductive electrode within said chamber along the inner surface of said central portion, (d) an electrical conductive electrode positioned within said chamber at each end thereof and extending across said axis adjacent each of said electrodes on said convergent end sections on the opposite side of said convergent electrodes from said electrode on the inner surface of said chamber, (e) magnetic field producing means positioned opposite each of said convergent end sections coaxial with said chamber for producing a magnetic field in symmetry with the axis of said chamber, (f) an ion injection means for injecting a stream of ions into said chamber at a point which is off the axis of said chamber and off the mid-plane of symmetry of the magnetic lines of force produced by said magnetic field producing means, and (g) said potentials on said electrode and said magnetic field having sufficient strength to curve ions injected into said chamber into an orbit about the magnetic lines of force while describing loops around the magnetic lines of force and advancing said ion loops around the longitudinal axis of said magnetic field while moving said ions back and forth past the midplane of said magnetic field wherein ions in the loops collide with each other near the axis of said chamber.

5. A thermonuclear device which comprises:

(a) a highly evacuated chamber, (b) said chamber including a central portion with opposing convergent end sections extending about an axis through said chamber with their convergent ends away from the center of said chamber, (c) an electrically conductive electrode positioned along the inner surface of said central section symmetrical with said axis through said chamber and maintained at ground potential, (d) an electrically conductive electrode extending along the inner surface of each of said convergent end sections of said chamber, electrically separated from said electrically conductive electrode along the central portion of said chamber and maintained at a potential positive with respect to said electrode extending along the central portion of said chamber, (e) an electrically conductive electrode positioned within said evacuated chamber at each end thereof and extending across said axis adjacent each of said electrodes positioned along said convergent end sections and on the opposite side thereof from the electrode extending along the central section of said chamber, (f) said electrodes positioned within said chamber opposite said electrodes on said convergent end sections having a potential negative with respect to said electrode extending along said central portion of said chamber, (g) a magnetic field producing means positioned opposite each of said convergent end sections coaxial with said chamber for producing a magnetic field in symmetry with the axis of said chamber, (h) an ion injection means having an end inserted into said chamber and insulated from said electrode positioned along said central portion of said chamber, (i) said ion injection means positioned within said chamber for injecting a stream of ions into said chamber at a point which is off the axis of said chamber and off the mid-plane of symmetry of the magnetic lines of force produced by said magnetic field producing means, (j) said potentials on said electrodes, and said magnetic field are of sufficient strength to curve ions injected into said chamber into an orbit about said magnetic lines of force while describing loops around the magnetic lines of force and advancing said ion loops around the longitudinal axis of said magnetic field while moving said ions back and forth past the midplane of said magnetic field wherein ions in the orbiting loops collide with each other near the axis of said chamber, and (k) said electrodes on said convergent ends prevents ions from escaping from the ends of said chamber while said electrodes opposite said electrodes on said convergent ends prevent electrons from escaping from the ends of said chamber.

6. A device as claimed in claim 5 wherein:

a pair of coils of wire are positioned around the outside of said central portion equi-distant from a plane through the center of said chamber perpendicular to said axis through said chamber for superimposing a varying current upon the magnetic field to induce an electromotive force on the particles in said chamber.

References Cited in the file of this patent

UNITED STATES PATENTS

| | | |
|---|---|---|
| 2,636,990 | Gow | Apr. 28, 1953 |
| 2,672,560 | Berry | Mar. 16, 1954 |
| 2,769,096 | Frey | Oct. 30, 1956 |
| 2,790,902 | Wright | Apr. 30, 1957 |
| 2,910,414 | Spitzer | Oct. 27, 1959 |
| 2,993,851 | Thomson et al. | July 25, 1961 |

OTHER REFERENCES

R. F. Post: Reviews of Modern Physics, vol. 28, No. 3, July 1956, pages 338–340, 359, 360, 362.

Chemical and Engineering News, volume 36, No. 22, June 2, 1958, page 46.